Patented Sept. 23, 1952

2,611,732

UNITED STATES PATENT OFFICE 2,611,732

COMPOSITIONS CONTAINING MIXTURES OF 4-AMINOSALICYLIC ACID AND ITS BASIC CALCIUM SALT

Richard P. Germann, Plainfield, Martin E. Hultquist, Bound Brook, and James M. Smith, Jr., North Plainfield, N. J., assignors to American Cyanamid Company, New York, N. Y., a corporation of Maine No Drawing. Application July 24, 1950, Serial No. 175,666

4 Claims. (Cl. 167—68)

This invention relates to a new mixture of 4-aminosalicylic acid and its basic calcium salt.

4-aminosalicylic acid has become of great importance in the treatment of tuberculosis in human beings, particularly chronic tuberculosis. The compound is used in large doses and often over long periods of time. The therapy has been adversely affected by undesirable side reactions. When the free acid is used in the large doses necessary, the excessive acidity has resulted in serious stomach disturbances in a number of patients. The suggestion has been made to use the sodium salt which is readily obtainable and which, like the free acid itself, is stable in storage. However, the large doses necessary, introduce too much sodium into the system, upsetting the potassium balance and producing undesirable side reactions.

Calcium salts of 4-aminosalicylic acid are known. There are two salts, the neutral salt having the following formula:

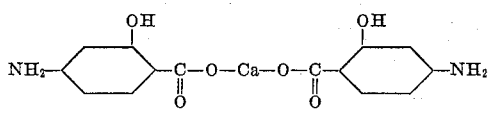

and the so-called basic salt, having the following formula:

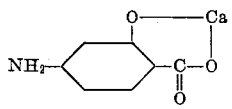

Neither of these calcium salts are desirable forms in which to prepare and use 4-aminosalicylic acid. The neutral salt is very soluble in water and is extremely difficult to isolate in pure form. It tends to darken on drying, and is unstable to storage.

The basic salt is very easily obtained in high yield and pure form, but it is practically insoluble in water and its alkalinity is so high that it tends to decompose and discolor on storage.

According to the present invention, we have found that when a substantially equimolecular mixture of 4-aminosalicylic acid and the basic calcium salt is prepared, the mixture, which is a pure white, free-flowing powder, is stable over long periods of time, and when placed in water it dissolves to form a clear solution which is suitable for oral administration. The solution is substantially neutral and as it does not introduce large quantities of sodium into the human body, there is no disturbance of the normal potassium balance. It is not known just why the mixture is so stable in storage, and the invention is therefore not limited to any theory of action.

While substantially equimolecular mixtures of basic calcium salt and free acid are preferred because of the formation of clear solutions therefrom, it is possible to depart somewhat from these proportions. Thus, a small excess of the calcium salt (not more than 5%), so that when dissolved in water a pH of 8–9 results, does not show any great decrease in stability on storage. On the other hand, it is perfectly possible to use mixtures in which there is a small excess, up to about 10%, of the free 4-aminosalicylic acid.

It should be understood that the mixture of the present invention may also be used in conjunction with other compounds of 4-aminosalicylic acid. Thus, for example, a composition may be prepared containing small amounts of the sodium salt of 4-aminosalicylic acid, say up to 10 or 15%. In such cases the mixture still dissolves readily to form clear or substantially clear solutions, and the comparatively small amount of the sodium salt used is insufficient to effect any serious disturbance of the potassium balance in the human body. In other words, the present invention includes 4-amino salicylic acid compositions in which the major constituent containing the 4-aminosalicylic acid radical is the mixture of the basic calcium salt and the free acid, and the invention is not limited to compositions containing the mixture alone. However, in every case, the major content of 4-aminosalicylic acid compounds should be in the form of the mixture of the basic calcium salt and the free acid.

The invention will be described in greater detail in conjunction with the following specific examples; parts are by weight.

Example 1

28.6 parts of anhydrous calcium chloride is dissolved in 100 parts of water and clarified with 2.8 parts of activated carbon. 37.9 parts of 4-aminosalicylic acid is dissolved in 100 parts of water by adding a clarified solution of 10.3 parts of sodium hydroxide dissolved in 10.3 parts of water. This solution is clarified with 3.8 parts of activated carbon. The clarified calcium chloride solution is added slowly to the clarified sodium 4-aminosalicylate solution. After addition is complete, 10.3 parts more of clarified sodium hydroxide dissolved in 10.3 parts of water is added with stirring. The product is cooled to 5° C. with stirring, filtered, washed with water, absolute ethanol, and isopropyl acetate and dried for 2 hours at 50° C.

Example 2

1.5313 parts of 4-aminosalicylic acid is ground with 2.4525 parts of basic calcium 4-aminosalicylate trihydrate. The composite mixture is a pure white, free-flowing powder. It is dissolved in 50 parts of water by the addition of a trace more basic calcium 4-aminosalicylate trihydrate. The colorless solution is clear, and has a pH of 8.5.

*Example 3*

1.5313 parts of 4-aminosalicylic acid is ground with 2.4525 parts of basic calcium 4-aminosalicylate trihydrate. 25 parts of distilled water is added. To this mixture is added basic calcium 4-aminosalicylate trihydrate (0.0484 part), to cause complete solution. The pH of this solution is 8.6.

*Example 4*

30.62 parts of 4-aminosalicylic acid is ground in a mortar with 50.02 parts of basic calcium 4-aminosalicylate trihydrate. The mixture is then rolled for two hours to cause complete mixing. A small sample of this solution when dissolved in distilled water under nitrogen gives a colorless, non-turbid solution with a pH of 8.5.

The invention has been described in terms of compositions containing only free 4-aminosalicylic acid and salts thereof. For many purposes these concentrated compositions are to be preferred. However, it is obvious that where desirable for therapeutic use, the active ingredients may be mixed with the conventional water-soluble excipients. The essential feature of the invention is that the major 4-aminosalicylic acid radical containing constituents be in the form of the mixture of the basic calcium salt and the free acid.

We claim:

1. A solid 4-aminosalicylic acid radical composition having the major 4-aminosalicylic acid constituent in the form of a mixture of 45–52.5 molar per cent basic calcium 4-aminosalicylate and 55–47.5 molar per cent 4-aminosalicylic acid, the solid composition being characterized by high stability on storage and being capable of solution in water.

2. A composition according to claim 1 in which the only 4-aminosalicylic acid radical containing constituent is the mixture of the basic calcium salt and the free acid.

3. A composition according to claim 2 in which the basic calcium salt and 4-aminosalicylic acid are present in substantially equimolecular proportions.

4. A composition according to claim 1 in which the basic calcium salt and 4-aminosalicylic acid are present in substantially equimolecular proportions.

RICHARD P. GERMANN.
MARTIN E. HULTQUIST.
JAMES M. SMITH, JR.

REFERENCES CITED

The following references are of record in the file of this patent:

UNITED STATES PATENTS

| Number | Name | Date |
|---|---|---|
| 427,564 | Gnehm et al. | May 13, 1890 |

FOREIGN PATENTS

| Number | Country | Date |
|---|---|---|
| 12,191 | Great Britain | of 1889 |